No. 647,046. Patented Apr. 10, 1900.
J. D. TESSIER.
BICYCLE CHAIN.
(Application filed July 12, 1899.)

(No Model.)

Witnesses:
Harry M. Rugg.
W. E. Regan.

Inventor
J. D. Tessier,
By Attorneys,
Southgate & Southgate

UNITED STATES PATENT OFFICE.

JOSEPH DONAT TESSIER, OF WORCESTER, MASSACHUSETTS.

BICYCLE-CHAIN.

SPECIFICATION forming part of Letters Patent No. 647,046, dated April 10, 1900.

Application filed July 12, 1899. Serial No. 723,533. (No model.)

*To all whom it may concern:*

Be it known that I, JOSEPH DONAT TESSIER, a citizen of the United States, residing at Worcester, in the county of Worcester and State of Massachusetts, have invented a new and useful Bicycle-Chain, of which the following is a specification.

My invention relates to that form of drive-chains employed in bicycles and for similar purposes which are constructed with detachable links, whereby the length of the chain may be altered or adjusted without the use of special tools; and the object of my present invention is to provide a strong, simple, and inexpensive form of chain which will work with comparatively little friction and will wear less rapidly than the detachable-link chains which have heretofore been employed.

To these ends my invention consists of the chain and its features of construction, as hereinafter described and more particularly pointed out in the claims at the end of this specification.

Figure 1:
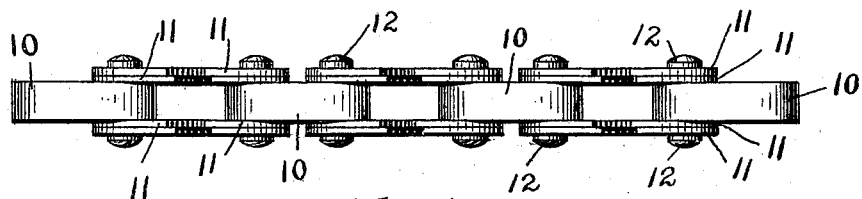
Figure 2:
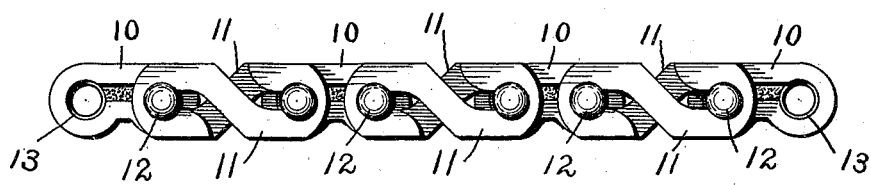
Figure 3:
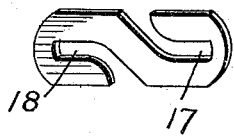
Figure 4:
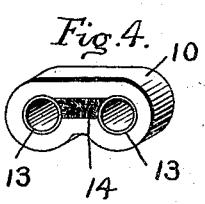
Figure 5:
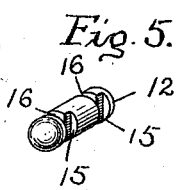
Figure 6:
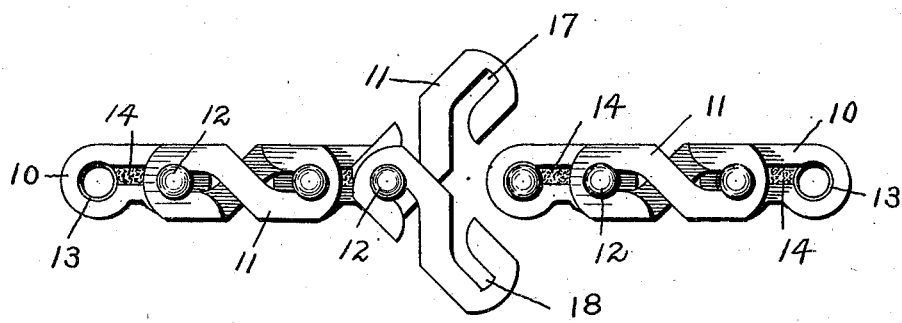

In the accompanying drawings, Figure 1 is a plan view of a bicycle-chain constructed according to my invention. Fig. 2 is a side view thereof. Fig. 3 is a detail perspective view of one of the S-shaped side links. Fig. 4 is a detail perspective view illustrating the form of chain-block which I prefer to employ. Fig. 5 is a perspective view of one of the pins which connect the pairs of S-shaped side links and form pivots upon which the chain-blocks turn, and Fig. 6 is a side view illustrating the manner in which the side links may be detached for the insertion or removal of additional links.

A bicycle-chain constructed according to my present invention preferably comprises chain-blocks, side links arranged in pairs upon opposite sides of the blocks, and pins connecting the side links and turning therewith, so as to form pivots upon which the chain-blocks may pivot or turn. In prior forms of detachable-link bicycle-chains the side links have been arranged so that they can swivel or turn on the pins.

The side links are necessarily comparatively narrow, and in practice I have found that the bearings of the side links upon the pins in that class of bicycle-chains to which my invention relates speedily become worn, so as to weaken the chains and cause the same to be unreliable. To avoid this difficulty in a bicycle-chain constructed according to my invention, the pins which connect the pairs of side links upon opposite sides of the chain-blocks are keyed or connected to said side links so as to have a fixed position with respect thereto, and by having the chain-blocks swivel or turn upon the pins I am enabled to cause the wear of the chain to come upon longer and more perfectly-fitting bearings than in the prior forms of detachable-link bicycle-chains with which I am familiar.

The chain-blocks which I employ may be of the ordinary solid construction; but in practice I prefer to employ chain-blocks having a central opening which may be filled with felt or other absorbent dust-excluding material which will absorb oil and assist in lubricating the chain.

The side links which I employ and which are arranged in pairs upon opposite sides of the chain-blocks are preferably of substantially an S shape, and the pins, which connect the pairs of side links and have a fixed relation with respect thereto, have notched or keyed sections for engaging one of the side links on each side of the chain and reduced cylindrical sections for engaging the other side link upon each side of the chain.

Referring to the drawings and in detail, 10 designates the chain-blocks, 11 designates the substantially S-shaped side links arranged in pairs upon opposite sides of the chain-blocks, and 12 designates the pins which connect the pairs of side links upon opposite sides of the chain-blocks and which are keyed or connected to said side links so as to have a fixed relation with respect thereto.

The chain-blocks 10 may be of the ordinary solid form; but in practice I prefer to employ chain-blocks of the construction most clearly illustrated in Fig. 4. As shown in this figure, a chain-block 10 is milled out to form an open link. Fitting into the opposite ends of the block 10 are bushings 13, and packed into the space between the bushings 13 is a filling of felt or other material which will serve to absorb oil and assist in lubricating the chain.

The form of pin 12 which I prefer to employ for connecting the pairs of side links on opposite sides of the chain-block is most clearly illustrated in Fig. 5. As shown in this figure, each of the pins 12 is provided with slabbed or keyed sections 15 for locking the same in a fixed position with respect to the side links 11, and with reduced or cylindrical sections 16 for engaging the remaining side link upon each side of the chain-block.

The S-shaped side links 11, as most clearly illustrated in Fig. 3, have notches or grooves 17 and 18. The notch or groove 17 of an S-shaped side link 11, which engages a slabbed or keyed section 16 of a pin 12, is a little longer than the slot or groove 18, which engages one of the reduced cylindrical sections 16 of the pins.

In assembling a bicycle-chain constructed according to my invention the S-shaped side links 11 may be spread apart or opened, as illustrated in Fig. 6, and when the links are swung together to engage a pin 12 the slabbed or keyed sections 15 of the pin will lock said pin into a fixed relation with respect to said side links, so that the chain-blocks 10 will swivel or turn upon the pins rather than permitting the side links to pivot or turn on said pins.

I am aware that numerous changes may be made in the construction of my bicycle-chain by those who are skilled in the art without departing from the scope of my invention as expressed in the claims. I do not wish, therefore, to be limited to the form of construction which I have herein shown and described; but—

What I do claim, and desire to secure by Letters Patent of the United States, is—

1. In a drive-chain, the combination of chain-blocks, pins extending transversely through the blocks, and S-shaped side links arranged in pairs upon opposite sides of said blocks, substantially as described.

2. In a drive-chain, the combination of chain-blocks, pins extending transversely through the blocks, and S-shaped side links arranged in pairs upon opposite sides of the blocks, said pins being connected to the side links so as to have a fixed relation with respect thereto, substantially as described.

3. In a drive-chain, the combination of chain-blocks, oppositely-facing S-shaped side links arranged in pairs upon opposite sides of the blocks, and pins extending transversely through the chain-blocks, said pins having keyed or slabbed sections for holding said pins in fixed relation with respect to the side links, substantially as described.

4. In a drive-chain, the combination of chain-blocks, oppositely-facing S-shaped side links arranged in pairs on opposite sides of the chain-blocks, and pins extending transversely through the chain-blocks, said pins having keyed or slabbed sections for engaging one side link upon each side of the blocks, and reduced cylindrical sections for engaging the remaining side links, the slots or grooves in the side links which are engaged by the slabbed or keyed sections of the pins being longer than the slots or grooves of said side links which receive the cylindrical sections of said pins, substantially as described.

5. As an article of manufacture a chain-block for bicycle-chains having its central part bored out and having bushings secured near its opposite ends to form sockets for receiving transverse pins and having a stuffing of felt or similar absorbent material occupying the space between said bushings, substantially as described.

In testimony whereof I have hereunto set my hand in the presence of two subscribing witnesses.

JOSEPH DONAT TESSIER.

Witnesses:
PHILIP W. SOUTHGATE,
LOUIS W. SOUTHGATE.